Jan. 29, 1974　　　M. D. WEISINGER　　　3,788,926

METHOD OF MANUFACTURING BORON-ALUMINUM COMPOSITE TUBES

Filed April 3, 1972

United States Patent Office 3,788,926
Patented Jan. 29, 1974

3,788,926
METHOD OF MANUFACTURING BORON-ALUMINUM COMPOSITE TUBES
Martin Donald Weisinger, San Diego, Calif., assignor to General Dynamics Corporation, San Diego, Calif.
Filed Apr. 3, 1972, Ser. No. 240,711
Int. Cl. B29c 17/07
U.S. Cl. 156—286                                    11 Claims

ABSTRACT OF THE DISCLOSURE

A method of forming high strength tubes from composites comprising boron fibers in an aluminum matrix is disclosed. A first metal tube having an internal diameter substantially equal to the desired composite tube external diameter is provided with an evacuation fitting. Sheets in which boron fibers are unidirectionally bonded to aluminum are wrapped around a second, narrower, metal tube with the fibers parallel to the tube axis. The wrapped second tube is inserted into the first tube and the inter-tube space is sealed at each end, as by welding. The inter-tube space is evacuated and the fitting sealed. The second tube is selected to have substantially less wall strength than the first tube. Preferably, this is accomplished by using tubes formed from the same material, but with the first tube having a wall thickness at least twice that of the second tube. The assembly is then placed in an autoclave and heated to a temperature of from about 800 to 1000° F. under a pressure of from about 3000 to 10,000 p.s.i. This causes the second (inner) tube to expand, pressing the composite layer against the inner wall of the outer tube, while diffusion bonding the wrapped composite into a single unitary tube. The assembly is cooled and the first and second tubes are removed, such as by chemical etching. A highly uniform high strength seamless composite tube results.

BACKGROUND OF THE INVENTION

Recently, structures formed from high strength fibers in a supporting matrix have come into widespread use. Fiberglass reinforced synthetic resin structures are widely used. With the development of high strength graphite fibers has come the development of structures using them in both metallic and plastic matrices.

Composites comprising unidirectionally arrayed boron fibers in an aluminum matrix have a number of advantages in aerospace applications. These composites have outstanding mechanical properties, including high stiffness and high transverse strength, making them an excellent choice for tubular truss elements loaded unidirectionally. These composites are also very much lighter in weight than structures of equal strength formed from other materials.

Unfortunately, these composites are very difficult to form. The low elongation of the fibers prevents any stretch in the material in the fiber direction. Conventional sheet metal forming methods such as stretch wrapping are not suitable for composites, since a pre-stretch using this method would either rupture the fiber or fail the matrix. Attempts to form composite shapes by compression have been largely unsuccessful due to Thus, there is a continuing need for improved fabrication processes for the manufacture of uniform high quality tubular structures from aluminum/boron composite materials.

SUMMARY OF THE INVENTION

It is, therefore, an object of this invention to provide a fabrication process for aluminum/boron composite materials which overcomes the above-noted problems.

Another object of this invention is to produce aluminum/boron seamless composite tubular structures of high quality with reproducibly uniform outside diameters.

Still another object of this invention is to provide a process of fabricating tubular structures from aluminum/boron composite materials which minimizes fiber distortion and rupture.

The above objects, and others, are accomplished in accordance with this invention, basically, by a process in which a coil of aluminum sheet containing unidirectionally arranged boron fibers is placed between two forming tubes which are evacuated and sealed, then subjected to high isostatic pressure and moderately high temperature to expand the inner tube and consolidate the composite sheets into a tube, after which the composite tube is removed by treating the assembly with a reagent which attacks only the forming tubes.

In order to assure that the inner forming tube expands outwardly to press the composite material against the inner wall of the outer forming tube, it is strongly preferred that the wall strength of the outer tube be at least twice the wall strength of the inner tube. This is most easily and conveniently accomplished by using the inner and outer tubes of the same composition, with the outer tube having at least twice the wall thickness of the inner tubes.

It has been found to be highly undesirable to use a weaker outer tube, since if it is deformed inwardly under isostatic pressure wrinkles, folds and fractured fibers are produced in the composite tube. Use of equal tube wall thicknesses permits full consolidation of the composite material but allows the overall tube shape to deform out-of-round as a result of the differences in total inner and outer forces, this force difference being equal to the pressure times the difference in exposed surfaces of the inner and outer tubes. Surprisingly, where the preferred stronger outer tube is used, the composite tube is found to have a higher degree of concentricity and to be more uniformly round than either of the original forming tubes.

Any suitable tubing may be used for the inner and outer forming tubes. Typical materials include iron, mild steel, stainless steel, copper, and nickel. Mild steel is preferred since it is available in a variety of diameters in a smooth surfaced seamless tubing, is inexpensive, and may be quickly and conveniently removed with nitric acid which has no serious deleterious effect on the composite material. The inner surface of the outer tube and the outer surface of the inner tube between which the composite material is pressed, should be smooth and reasonably blemish free. Also, the inner surface of the inner tube should be substantially free from longitudinal scratches or striations, since these may cause cracks as the inner tube expands during the forming operation. Where both inner and outer forming tubes have the same composition, it is preferred that the outer tube have a wall thickness from about one and one-half to three times the thickness of the inner tube. Where both tubes are formed from mild steel, best results are obtained where the inner tube has a wall thickness of from about 0.062 to 0.125 inch and the outer tube has a thickness of from about 0.100 to 0.187 inch, in proportion.

The space between the ends of the inner and outer forming tubes may be sealed by any suitable means. Preferably, end filler rings or spacers which substantially fill the inter-tube space are inserted and the tubes and rings are welded around the end circumference.

Any suitable composite comprising boron fibers in an aluminum matrix may be formed into tubes by the process of this invention. Typically, the composite preform sheets consist of a plurality of substantially contiguous parallel boron fibers bonded to an aluminum foil. These sheets may be produced by any suitable process. Typically, fibers are adhesively bonded to an aluminum foil, then the fibers are covered with a second foil and the sheets pressure bonded to form a unitary tape or sheet. These single layer tapes are usually diffusion bonded together but may be used simply in the adhesively bonded condition. Alternately, the fibers may be bonded to an aluminum foil by plasma-sprayed aluminum to preform sheets. Any suitable aluminum alloy may be used. Typical alloys include 2024 and 6061 aluminum. Any suitable boron fibers or filaments may be incorporated into the composite. Typical fibers have diameters of from about 0.0040 to 0.0057 inch, tensile strength of at least 400,000 p.s.i. and tensile modulus of elasticity of at least $55 \times 10^6$ p.s.i. Typical fibers comprise a thin tungsten wire over which the boron has been deposited. A thin silicon carbide coating may be deposited on the boron surface to improve high temperature characteristics. While any suitable arrangement of boron fibers may be used, a parallel closely spaced arrangement is preferred in truss members because the maximum properties are then realized in the direction of the load. The fibers in succeeding layers may be arranged at an angle to each other and to the final tube axis in order to increase transverse tube strength. If desired, other fibers, such as thin tungsten filaments, may be arranged crosswise of the unidirectional boron filaments to improve the transverse strength of the preform sheets. Typically, the boron fibers may be spaced at about 175 fibers per inch of width and the boron fiber content in the sheet may be about 50% by weight.

The isostatic forming and bonding pressure may be applied in any suitable manner. Isostatic pressing requires the application of uniform pressure to all surfaces of the workpiece, such as through a gas or liquid. A high pressure gas autoclave is preferred since an accurate high temperature and pressure environment may be easily maintained.

While any suitable consolidation pressure, temperature and time may be used, for most tubing applications it is preferred that a pressure of from about 3000 to 10,000 p.s.i.g. and a temperature of from about 800 to 1000° F. be maintained for from about 1 to 3 hours.

BRIEF DESCRIPTION OF THE DRAWING

Details of the invention and of certain preferred embodiments thereof will be further understood upon reference to the drawing, wherein.

DETAILED DESCRIPTION OF THE DRAWING

Figure 1:
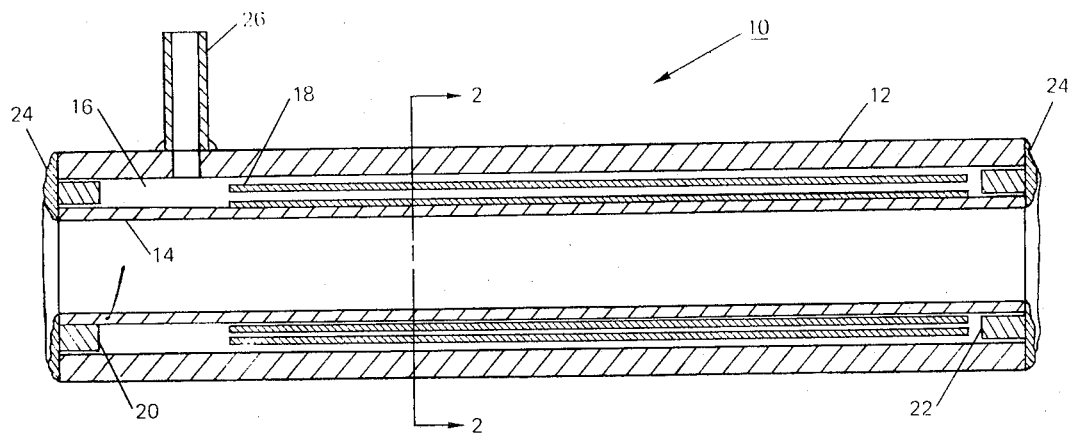
FIG. 1 is a longitudinal section through a tube forming assembly.

Referring now to FIG. 1, there is seen a longitudinal section taken along the axis of a tubular forming assembly generally designated 10. The assembly 10 includes a heavy-walled outer forming tube 12 and a thinner inner forming tube 14 defining annular space 16 therebetween. A coil 18 of boron/aluminum sheet material is located in space 16. Coil 18 may be formed by wrapping composite sheet material around tube 14 before tube 14 is placed within tube 12, or sheet material may be coiled or wrapped around a suitable mandrel from which it is removed, then is slipped between tubes 12 and 14. Spacers 20 and 22 substantially fill the inter-tube gaps at each end of the assembly. These gaps are then closed and the ends sealed with a weld overlay 24 at each end.

An evacuation tube 26 is secured, as by brazing or welding, over an opening in tube 12. After assembly 10 is assembled and welds 24 are completed, the inter-tube space is evacuated through tube 26, after which tube 26 is sealed, such as by crimping it together.

Figure 2:
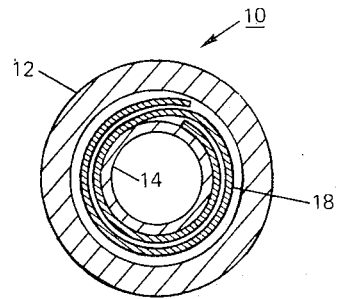
FIG. 2 is a transverse section taken on line 2—2 in FIG. 1, showing the assembly prior to isostatic pressing.
Figure 3:
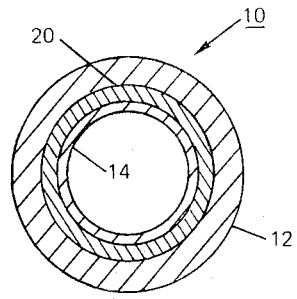
FIG. 3 is a transverse section taken substantially on line 2—2 in FIG. 1 subsequent to isostatic pressing.

As seen in FIG. 2, coil 18 of composite material is loosely fitted in the inter-tube space prior to isostatic pressing. After isostatic pressing, such as in a gas autoclave, inner tube 14 has expanded, pressing the composite material of coil 18 against the inner wall of tube 12, producing a consolidated composite tube 20. Forming tubes 12 and 14 are removed, such as by acid etching, leaving a uniform strength composite tube 20.

Preferred processes for forming composite tubing using the assembly illustrated in the drawing are detailed in the following examples. Parts and percentages are by weight unless otherwise indicated.

Example I

Four layers of boron/aluminum tape, available from the Hamilton-Standard Division of United Aircraft under the "Borsic" trademark, are wrapped around a ⅞ inch outside diameter AISI 1015 mild steel seamless tube having a wall thickness of about 0.035 inch. The Borsic tape comprises unidirectionally arranged silicon carbide coated boron fibers having diameters of about 0.004 in an aluminum matrix. The tape has a preconsolidated thickness of about 0.007 inch and a boron fiber content of about 50% by weight. The tape is wrapped with the fibers oriented substantially parallel to the tube axis. The wrapped tube is then inserted into a 1¹⁄₁₆ inch outside diameter by 0.065 inch wall thickness seamless tube of AISI 1015 mild steel. A narrow evacuation tube is connected to an opening in the wall of this tube near one end. Narrow ring spacers are then inserted at each end to substantially fill the inter-tube gap. A weld overlay over the tube ends and spacers is applied to seal the tube ends. The tube is evacuated and the evacuation tube is sealed by crimping it. The resulting forming assembly is then placed in a high pressure autoclave. A pressure of about 8000 p.s.i. is applied at a temperature of about 900° F. for about 2 hours. The assembly is then removed from the autoclave, cooled to room temperature and placed in a 50% nitric acid bath. The steel tubes are etched away, leaving a consolidated, uniform composite tube. The wall thickness and roundness of the tube are very uniform and the outer diameter of the tube accurately reflects the inner diameter of the outer forming tube. A lengthwise compression test of the tube reveals an ultimate compression strength exceeding 180,000 p.s.i.

Example II

An inner forming tube of fully annealed AISI 1015 seamless tubing, ⅞ inch outer diameter and 0.066 inch wall thickness, is wrapped as follows: one layer of 6061–0 aluminum foil, 0.0025-inch thick, three layers of 0.005-inch thick boron/aluminum sheet, and one layer of 0.0025-inch thick aluminum foil which had been lightly plasma sprayed with aluminum, producing a roughened surface. The boron/aluminum sheet consists of collimated fibers of boron diffusion bonded between 6061 aluminum foils and is available from the Amercom Corporation. The wrapped inner tube is then inserted in an outer forming tube of as-drawn 1.160 inch outer diameter, 0.100 inch wall thickness seamless AISI 1015 tubing. Spacer rings are then inserted at each end, substantially filling the inter-tube gap. All of these parts and sheets are thoroughly degreased and cleaned in acetone prior to assembly. The outer forming tube is provided with a narrow evacuation tube connected to an opening near one end of the tube. The ends of the tubes and spacer rings are sealed by welding, the inter-tube space is evacuated and the evacuation tube is sealed. The resulting assembly is then placed in a high pressure autoclave and maintained at about 9000 p.s.i. and about 800° F. for about three hours. The assembly is then removed and cooled to room temperature. The outer surface is rough turned on a lathe so that the wall thickness of the outer tube is substantially equal to the 0.066 inch wall thickness of the inner tube. The assembly is then placed in a 50% nitric acid bath at a temperature of about 150° F. The forming tubes are etched away in about 30 minutes. If the outer tube had not been turned down, the inner tube would have etched away first and some etching of the aluminum inner surface would have occurred while the remainder of the outer tube was being removed. The composite tube produced is found to be highly consolidated and have excellent dimensional and surface uniformity.

Example III

A mandrel having a 3 inch outer diameter is wrapped with four layers of Borsic boron/aluminum tape, with the fiber orientation of each layer at about 45° to the mandrel axis and the fibers in each succeeding layer oriented at about 90° to the preceding layer fibers. The wrapping is slipped onto a 3 inch outer diameter seamless copper tube having a wall thickness of about 0.04 inch. The wrapped tube is then inserted into another copper tube which has an inner diameter of about 3.3 inch and a wall thickness of about 0.12 inch. Thin copper disks having inner and outer diameters equal to the inner diameter of the inner tube and the outer diameter of the outer tube, respectively, are placed over the ends of the assembly and brazed in place to seal the tube ends. An evacuation tube is threaded into a drilled and tapped hole in the wall of the outer tube, near one end of the tube. The assembly is then evacuated and the evacuation tube is sealed. The assembly is placed in a high pressure autoclave and maintained at about 900° F. and 3000 p.s.i. for about 3 hours. The assembly is removed, cooled, and treated with nitric acid until the forming tubes are etched away. The resulting seamless composite tube is found to have lower endwise compressive strength but greater transverse strength than tubes in which all boron fibers parallel the tube axis.

While specific conditions, proportions and arrangements have been described in the above description of preferred embodiments, these may be varied within the scope of this disclosure, depending on desired conditions, with similar results. For example, any suitable combination of forming tube and etching solution composition may be used.

Other modifications, applications and ramifications of the invention will become apparent to those skilled in the art upon reading this disclosure. These are intended to be included within the scope of this invention as defined in the appended claims.

I claim:

1. A method of fabricating high-strength tubes which comprises the steps of:
    providing composite sheets comprising boron fibers embedded in an aluminum matrix;
    forming a coil of said composite sheets around a first tube;
    inserting the wrapped first tube into a second tube; said second tube having at least 1½ times the wall strength of said first tube;
    substantially evacuating gases from between said tubes and sealing the ends of said tubes to produce a closed assembly;
    subjecting said assembly to a temperature of from about 800° to 1000° F. and an isostatic pressure of from about 3,000 to 10,000 p.s.i. for from about 1 to 3 hours, to permanently expand said first tube and press said composite sheets against the inner wall of said second tube; and
    treating said assembly with a reagent which attacks the composition of said first and second tubes to a greater extent than said composite sheets, whereby said first and second tubes are removed leaving a highly consolidated composite tube.

2. The method according to claim 1 wherein said first and second tubes have substantially the same composition and the wall thickness of said second tube is at least 1½ times the wall thickness of said first tube.

3. The method according to claim 2 wherein said first and second tubes are steel and said reagent is nitric acid.

4. The method according to claim 2 further including the step of turning said second tube down to a wall thickness substantially the same as the wall thickness of said first tube after said isostatic pressing step.

5. The method according to claim 1 wherein said second tube is provided with an evacuation fitting near one end and said assembly is sealed by inserting spacer rings between said first and second tubes at each end thereof, welding over the tube ends and spacer rings, evacuating the assembly through said fitting and sealing said fitting.

6. The method according to claim 1 wherein said boron fibers are arranged in a substantially parallel single layer orientation in each sheet and said sheets are wrapped on said first tube with said fibers substantially parallel to the axis of said first tube.

7. A method of fabricating high-strength tubes which comprises the steps of:
    providing composite sheets comprising a single contiguous layer of substantially parallel fibers comprising boron, embedded in a metal matrix comprising aluminum;
    wrapping said composite sheets around a first tube;
    inserting said wrapped first tube into a second tube, said second tube having substantially the same composition as said first tube, and having a wall thickness at least 1½ times the wall thickness of said first tube;
    substantially evacuating gases from between said tubes and sealing the ends of said tubes to produce a closed assembly;
    subjecting said assembly to a temperature of from about 800° to 1000° F. and an isostatic pressure of from about 3,000 to 10,000 p.s.i. for from about 1 to 3 hours, to permanently expand said first tube and press said composite sheets against the inner wall of said second tube; and
    treating said assembly with a reagent which attacks the composition of said first and second tubes to a greater extent than said composite sheets, whereby said first and second tubes are removed leaving a highly consolidated composite tube.

8. The method according to claim 7 wherein said first and second tubes are steel and said reagent is nitric acid.

9. The method according to claim 8 further including the step of turning said second tube down to a wall thickness substantially the same as the wall thickness of said first tube after said isostatic pressing step.

10. The method according to claim 7 wherein said second tube is provided with an evacuation fitting near one end and said assembly is sealed by inserting spacer rings between said first and second tubes at each end thereof, welding over the tube ends and spacer rings, evacuating the assembly through said fitting and sealing said fitting.

11. The method according to claim 7 wherein said boron fibers are arranged in a substantially parallel single layer orientation in each sheet and said sheets are wrapped on said first tube with said fibers substantially parallel to the axis of said first tube.

References Cited

UNITED STATES PATENTS

| | | | |
|---|---|---|---|
| 3,050,613 | 8/1962 | Sheinhartz et al. | 156—293 |
| 3,258,377 | 6/1966 | Scott | 156—294 |
| 3,177,105 | 4/1965 | Wiltshire | 156—285 |
| 2,977,269 | 3/1961 | Nerwick | 156—285 |

ALFRED L. LEAVITT, Primary Examiner

C. WESTON, Assistant Examiner

U.S. Cl X.R.

156—165, 191, 285, 294, 382